June 23, 1964  G. E. LIVINGSTON  3,138,393
COUPLING FOR SUBSTANTIALLY AXIALLY FIXED CONDUITS
Filed June 20, 1960  2 Sheets-Sheet 1

INVENTOR.
GEORGE E. LIVINGSTON
BY Woodling + Krost
ATTORNEYS

June 23, 1964  G. E. LIVINGSTON  3,138,393
COUPLING FOR SUBSTANTIALLY AXIALLY FIXED CONDUITS
Filed June 20, 1960  2 Sheets-Sheet 2

INVENTOR.
GEORGE E. LIVINGSTON
BY Woodling + Krost
ATTORNEYS

United States Patent Office 3,138,393
Patented June 23, 1964

3,138,393
COUPLING FOR SUBSTANTIALLY AXIALLY
FIXED CONDUITS
George E. Livingston, 55 Aberdeen St., Malverne, N.Y.
Filed June 20, 1960, Ser. No. 37,136
1 Claim. (Cl. 285—277)

The invention relates to couplings and more particularly to quick disconnect couplings for connecting and disconnecting sections of piping or merely first and second pipes or other conduit means which are rigid or in other words cannot be substantially moved axially relative to other sections or each other.

An object of the invention is to provide a coupling means for first and second conduits or pipes which includes a coupler which slides telescopically on one part to another part to secure the two parts together.

Another object of the invention is to provide a coupling which includes a nipple and insert conduit member with a coupler member slidably carried by the insert conduit member and telescopically movable onto the nipple member whereby detents carried thereby serve to lock the two members together in fluid conducting relationship.

Another object of the invention is to provide a quick connect and disconnect coupling wherein the two parts do not have to be moved axially relative to each other in order to connect the same in fluid conducting relationship.

Other objects and a fuller understanding of this invention may be had by referring to the following description and claim, taken in conjunction with the accompanying drawings in which:

Figure 1:
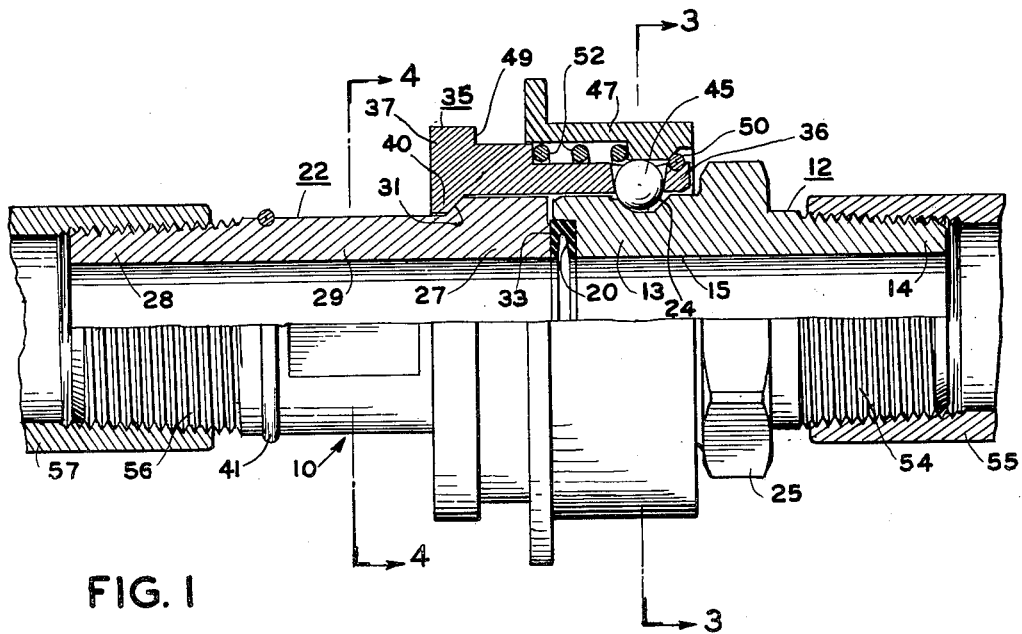
FIGURE 1 is a side elevational view, partially in section, of the coupling of the present invention in connected or coupled position.
Figure 2:
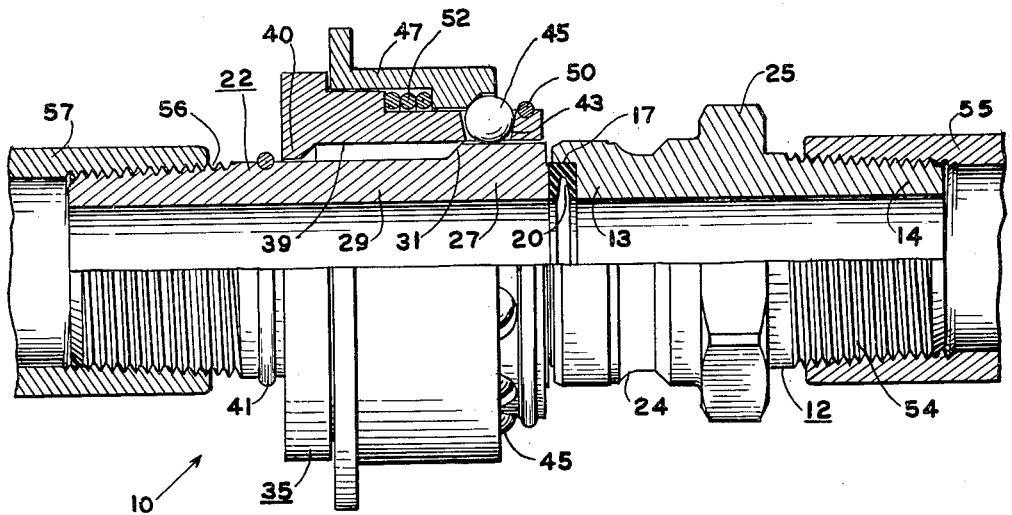
FIGURE 2 is a side elevational view, partially in section, similar to FIGURE 1 but showing the coupling in disconnected or uncoupled position.
Figure 3:
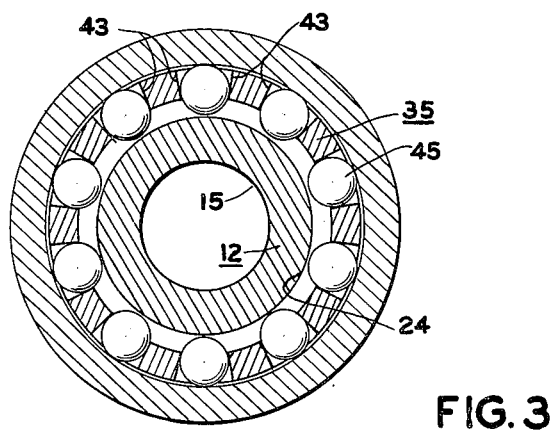
FIGURE 3 is a cross-sectional view taken generally along the line 3—3 of FIGURE 1.
Figure 4:
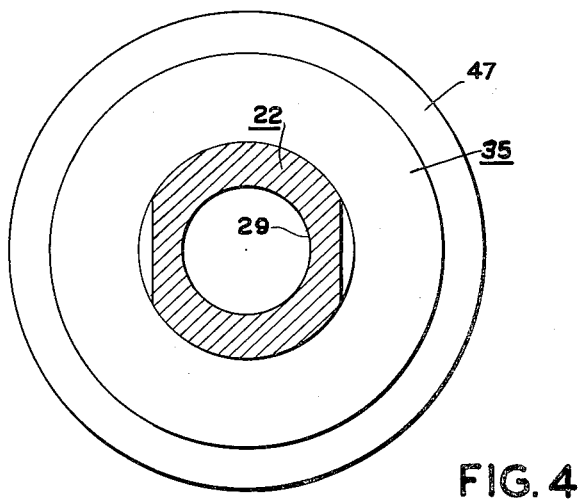
FIGURE 4 is a cross-sectional view taken generally along the line 4—4 of FIGURE 1.
Figure 5:
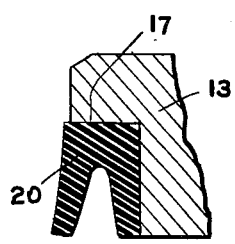
FIGURE 5 is an enlarged fragmentary view of a portion of the end of the nipple member shown in FIGURES 1 and 2.

The coupling shown and described herein is popularly referred to as a quick disconnect coupling and has been indicated generally by the reference numeral 10. The coupling 10 includes a nipple member 12 having first and second end portions 13 and 14, respectively, and wall means 15 define a fluid opening which extends axially therethrough. Wall means 17 define a counterbore which extends completely around the fluid opening 15 at the first end portion 13 of the nipple member. Positioned in the counterbore 17 is a sealing ring 20 which extends axially outwardly slightly beyond the extent of the first end portion of the nipple member. This sealing ring, as will be noted from viewing FIGURES 1, 2 and 3, is a V-section type sealing ring and is for the purpose of facilitating fluid sealing between the nipple member and an insert conduit member 22. The first end portion 13 of the nipple member is provided with a locking groove 24 or detent receiving wall means on the outer surface thereof, the purpose of which will be described hereinafter, and a hexagonal head 25 is also provided on the nipple member whereby a wrench or other tool may be applied thereto.

The insert conduit member 22 has first and second end portions 27 and 28, respectively, and wall means 29 define a fluid opening which extends axially through the insert conduit member. The insert conduit member has what may be referred to as a stop flange 31 on the outer surface of the first end portion thereof, and this flange has substantially the same diameter as the outside surface of the first end portion of the nipple member 12. A boss 33 is formed on the first end portion of the insert conduit member and as shown in FIGURE 1 is in engagement with the sealing ring 20 to provide a fluid seal between the nipple and insert conduit members. A coupler member 35 is provided for locking members 12 and 22 in fluid conducting relationship with each other and has first and second end portions 36 and 37, respectively. Wall means 39 define an opening through the coupler member and also serve to form a shoulder 40 in the opening at the second end portion of the coupler member. The coupler member, as will be seen from FIGURES 1 and 2 is positioned on the first end portion 27 of the insert conduit member and the diameter of the opening therein is substantially the same as the diameter of the stop flange or shoulder 31. The coupler member 35 is movable between locked (FIGURE 1) and unlocked (FIGURE 2) positions, and in other words, can be said to be telescopically mounted on the insert conduit member 22 for limited sliding movement with respect thereto. A snap ring 41 is located on the insert conduit member and the second end portion 37 of the coupler member is engageable with this snap ring to limit the movement thereof to the left or to the unlocked position. FIGURE 2 shows the coupler member adjacent the snap ring 41.

A plurality of detent locking apertures 43 are located about the periphery of the first end portion 36 of the coupler member 35, and these apertures are tapered to prevent the detent locking balls 45 from falling through the apertures in one direction. To prevent the detent locking balls from falling from the apertures 43 in another direction, a locking sleeve 47 is provided and has limited sliding movement on the surface of the coupler member 35. A shoulder 49 limits movement of the locking sleeve in one direction and a snap ring 50 limits movement of the locking sleeve in the other direction. A spring 52 biases the locking sleeve to the right, as seen in FIGURES 1 and 2. When the coupler member is telescopically moved over the nipple member 12 with the detent locking balls positioned over the locking groove, the locking sleeve 47 assumes the position shown in FIGURE 1 and prevents the balls 45 from leaving the locking groove. While in this position, the shoulder 40 on the coupler member engages the stop flange 31 thereby holding or locking the nipple member 12 and the insert conduit member in fluid conducting relationship with each other.

In order to uncouple the two members, it is necessary that the locking sleeve 47 be moved to the left as seen in FIGURES 1 and 2, against the urging of spring 52 and when so moved, the detent locking balls 45 may travel out of the locking groove 34, permitting the coupler member to be moved to the left as shown in FIGURE 2. Threads 54 have been provided on the second end portion of the nipple member 12 and threads 56 have been provided on the second end portion of the insert conduit member 22. This is to facilitate attachment of the nipple member to a conduit such as a piece of pipe 55, a portion of which has been shown, and threads 56 facilitate attachment of the insert conduit member to another piece of pipe 57. It will be readily appreciated by those skilled in the art that many other means might be utilized to connect these parts of the coupling to conduits or other fluid components with which they may be associated.

It will be thus appreciated from the foregoing description that the coupling described and claimed herein may be very advantageously used with fluid components wherein substantially no relative axial movement may be had between the same. For example, the coupling can be used advantageously to disconnect the two pieces of pipe 55 and 57 (particularly in the case where they are substantially rigidly or fixedly mounted) shown in FIGURE 1 and if a similar coupling were used at the other end of the pipe 55, it will be appreciated that the entire section of pipe could be removed without the use of any tools. The same type of system may also be utilized to remove other fluid components such as valves and strainers and the like. The coupling herein disclosed and described may also be conveniently used to accommodate "cleaning in place" of piping systems wherein such is desired, for example, in the food industry. The use of the two fluid conducting members with the coupler member which is carried by one and which may be telescopically moved onto the other to facilitate the action of detent locking means has proved to be a convenient and advantageous means of carrying out the objects discussed above.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A quick disconnect coupling for use with first and second conduits including in combination a nipple member having first and second end portions and wall means defining a fluid opening extending therethrough, wall means defining a counterbore around said fluid opening at said first end portion of said nipple member, a sealing ring positioned in said counterbore of said nipple member, said first end portion of said nipple member having a locking groove on the outer surface thereof, an insert conduit member having first and second end portions and wall means defining a fluid opening extending therethrough, said insert conduit member having a flange on said first end portion on the outer surface thereof, said first end portion of said insert conduit member being in engagement with said sealing ring, a coupler member having first and second end portions, wall means defining an opening through said coupler member and forming a shoulder in said opening at said second end portion of said coupler member, said coupler member being positioned on said first end portion of said insert conduit member for axial movement relative thereto, said coupler member being movable between a locked and an unlocked position, a plurality of detent locking apertures located about the periphery of the first end portion of said coupler member, detent locking balls positioned in said detent locking apertures, an axially movable locking sleeve surrounding said coupler member and having a spring operably disposed between a portion of said locking sleeve and a portion of said coupler member biasing said locking sleeve to locked position, said coupler member in locked position causing said detent locking balls to be positioned in said locking groove with said locking sleeve locking same therein and with said shoulder in said coupler member engaging said flange on said insert conduit member thereby maintaining said nipple and insert conduit members in fluid conducting relationship, said coupler member in said unlocked position being located out of alignment of a radial direction with said nipple member to permit movement of said nipple member and insert conduit member relative to each other in a generally radial direction and means on said second end portions of said nipple and insert conduit members whereby same may be connected to first and second conduits.

References Cited in the file of this patent

UNITED STATES PATENTS

| | | |
|---|---|---|
| 979,433 | Clay | Dec. 27, 1910 |
| 1,812,553 | Redfield | June 30, 1931 |
| 1,901,973 | Macey | Mar. 21, 1933 |
| 2,255,333 | Scheiwer | Sept. 9, 1941 |
| 2,318,112 | Stillwagon | May 4, 1945 |
| 2,643,140 | Scheiwer | June 23, 1953 |
| 2,962,303 | Ramberg et al. | Nov. 29, 1960 |